Figure 1:
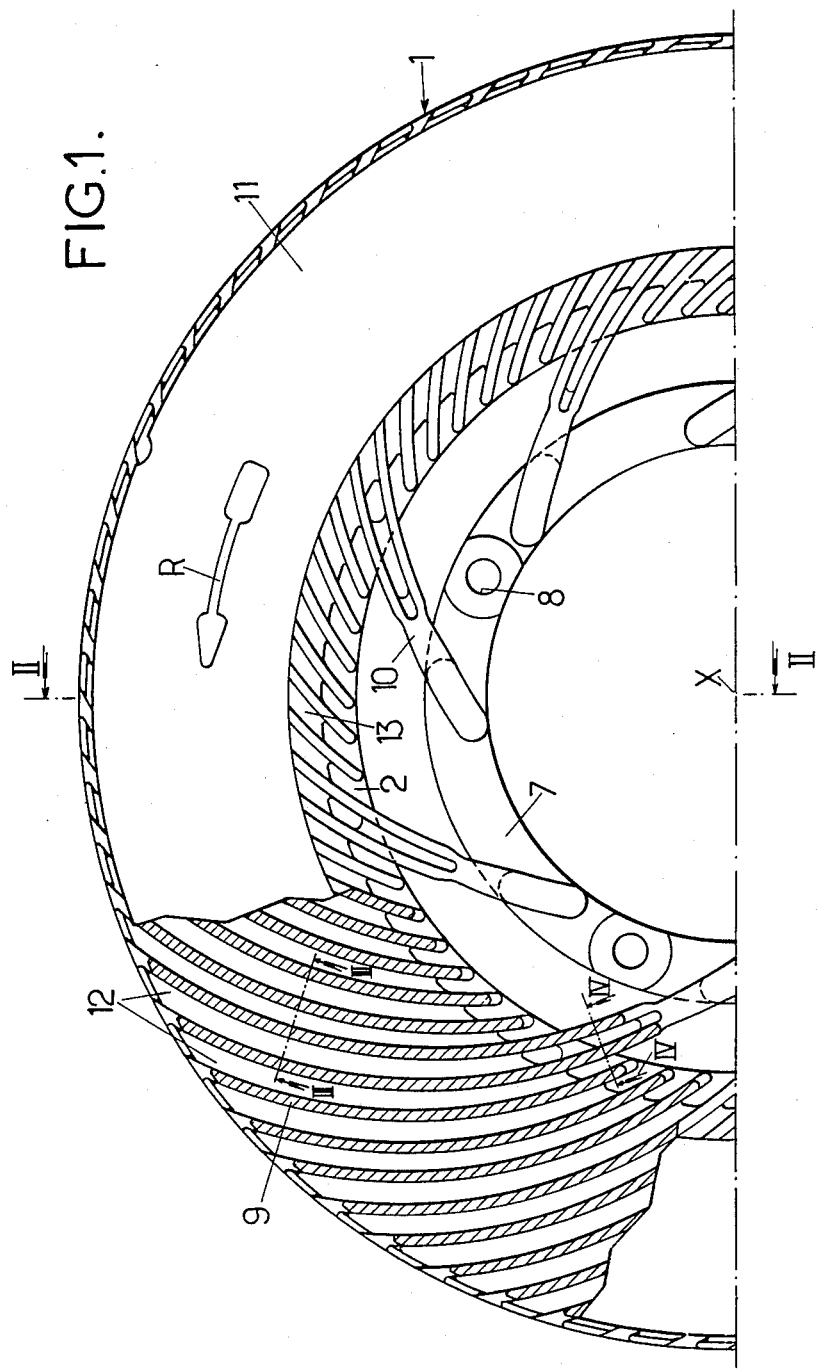

United States Patent [19]

Estaque

[11] Patent Number: 4,853,574
[45] Date of Patent: Aug. 1, 1989

[54] ARMATURE ROTORS OF ELECTROMAGNETIC RETARDERS

[75] Inventor: Michel Estaque, Taverny, France

[73] Assignee: Labavia S.G.E., Montigny Le Bretonneux, France

[21] Appl. No.: 307,544

[22] Filed: Feb. 7, 1989

[30] Foreign Application Priority Data

Feb. 23, 1988 [FR] France ............... 88 02125

[51] Int. Cl.⁴ ........................................... H02K 49/04
[52] U.S. Cl. ..................................... 310/105; 310/93; 188/264 A; 188/264 AA; 416/93 R; 416/186 R
[58] Field of Search ............. 310/105, 93; 188/264 A, 188/264 AA; 416/93 R, 186 R

[56] References Cited

U.S. PATENT DOCUMENTS

| | | | |
|---|---|---|---|
| 3,026,431 | 3/1962 | Bessiere | 310/93 |
| 3,465,853 | 9/1969 | Zabalbeitia | 188/264 A |
| 3,908,141 | 9/1975 | Lemonnier | 310/93 |
| 4,712,656 | 12/1987 | Courtois | 188/264 AA |
| 4,745,317 | 5/1988 | Estaque | 310/105 |
| 4,811,822 | 3/1989 | Estaque | 188/264 A |

FOREIGN PATENT DOCUMENTS

0652058 11/1962 Canada .................................. 310/93
0199639 4/1986 France .................................. 310/93

Primary Examiner—Peter S. Wong
Assistant Examiner—C. LaBalle
Attorney, Agent, or Firm—Larson and Taylor

[57] ABSTRACT

The invention provides an armature rotor for electromagnetic retarder, comprising at least one disc (2) extended axially on one of its faces by a plurality of fins (9), each fin being defined by two parallel or substantially parallel faces slanted with respect to the corresponding radii, the tips of the fins being connected together by an annular flange (11) and the assembly formed by the disc, the fins and the flange being made as a single moulded block from ferromagnetic material. The fins (9) of said rotor are particularly thin, numerous and so close together, the thickness of each fin being less than 5 mm and the width of the gap between two consecutive fins, in its narrowest zone, considered perpendicularly to the facing faces of the fins, being less than 10 mm.

10 Claims, 2 Drawing Sheets

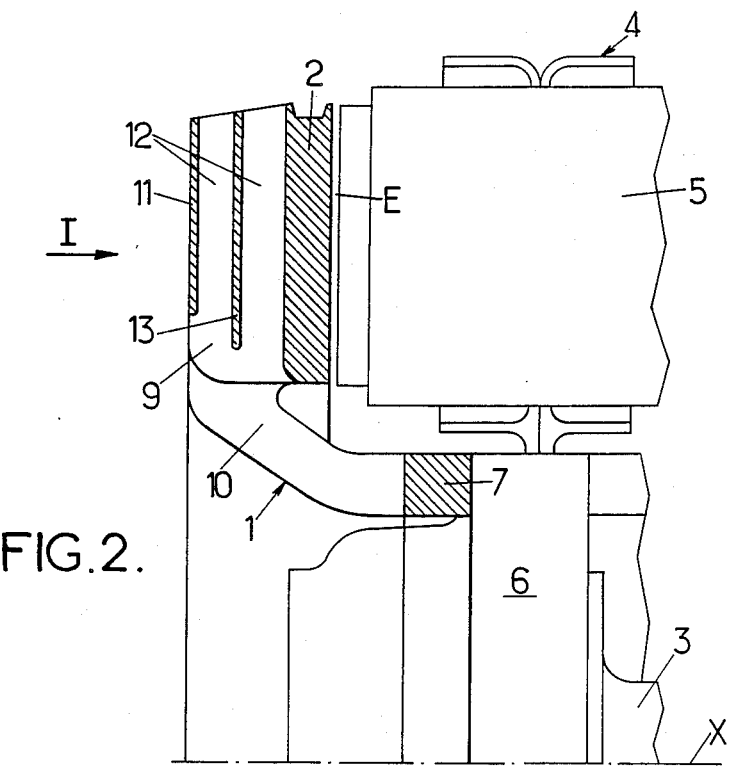
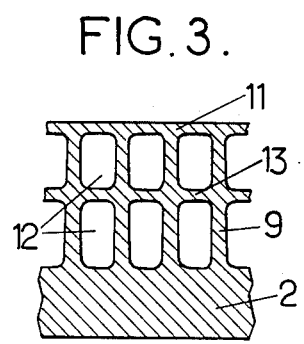
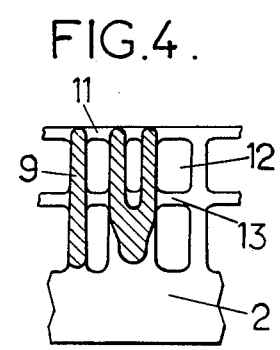

ARMATURE ROTORS OF ELECTROMAGNETIC RETARDERS

The invention relates to the armature or "induced" rotors of electromagnetic retarders, particularly for vehicles, which rotors comprise at least one disc made from a ferromagnetic material adapted to travel past a stator ring of alternately positive and negative electromagnetic poles, from which it is only separated by an air-gap, this disc being then braked and heated because of the creation of eddy currents in its mass.

Among these rotors, the invention relates more particularly to those in which the face of the disk opposite the air-gap is connected to a plurality of fins, each fin extending axially from said face and being defined by two parallel or substantially parallel faces slanted at each of their points rearwards with respect to the corresponding radii by angles greater than 45° and curved so that their concavities are turned rearwards, the tips of the fins being connected together by an annular flange and the assembly formed by the disc, the fins and the flange being made as a single moulded block.

It relates more particularly still, but not exclusively, among the rotors considered, to those in which the disc is connected to an internal fixing ring by arms extending some of the fins, this ring and these arms being also integrally moulded with the disc.

The removal of heat generated in the disc of such a rotor by the eddy currents, during use of the retarder equipped with such a rotor, takes place essentially by conduction, radiation and convection from the disc, from the fins and from the flange as well as from the arms if they are provided, the convection being greatly reinforced by ventilation: in fact, the presence of the fins causes the rotor to play the role of a fan by sweeping the hot surface to be cooled with a cooling air stream.

In known embodiments, the fins are relatively thick and few in number.

In fact, the rotors considered are generally manufactured by casting in sand moulds, which process does not make it possible to obtain fins with a thickness less than 7 mm; in practice, in known constructions, the rotors having an external diameter of about 500 mm comprise a number of fins at most equal to 24.

It was not thought moreover that it was advisable to reduce the thickness of these fins and to increase their number for improving cooling of the disc.

Now, such cooling is greatly desired.

It will be recalled, in fact:

that during operation, the disc may become red hot, its temperature reaching or even exceeding a value of about 700° C., and that the retarding torque likely to be generated by the retarder equipped with such a disc is reduced in a considerable proportion when this disc overheats.

Thus, such a torque may decrease from a value C to a value C/3, for given values of the speed of rotation and of the electric power consumed, when the disc heats up from ambient temperature to a temperature of about 700° C.

The object of the invention is especially to improve cooling of the disc during operation of the retarder and so to increase the value of the torque when hot generated by this apparatus without substantially increasing the torque required for driving the retarder.

For this, rotors of the kind in question in accordance with the invention are essentially characterized in that their fins are particularly thin, numerous and so close together, the thickness of each fin being less than 5 mm and the width of the gap between two consecutive fins, in its narrowest zone, considered perpendicularly to the facing faces of the fins, being less than 10 mm.

The applicant has surprisingly discovered that cooling of the rotors thus defined during operation thereof was greatly improved, and that their retarding torque when hot was increased in a considerable proportion with respect to prior art retarders; for a rotor with 64 fins in accordance with the invention, said increase in torque is about 50% with respect to a known type of rotor with 16 fins.

Concurrently, the Applicant has observed that for a some time processes for casting steel are available making it possible to produce parts having a complex geometry and relatively large dimensions comprising portions of small thickness, namely less than·7 mm.

These processes make possible the industrial manufacture of the improved rotors of the above defined kind.

In preferred embodiments, recourse is further had to one and/or other of the following arrangements:

the thickness of each fin is approximately 3 to 4 mm, the fins are joined together at an intermediate level between their base and their tip by a thin annulus moulded integrally therewith, the above annulus is flat, the thickness of the above annulus is about 3 mm, in a rotor of the above kind comprising arms for connection to a fixing ring, each arm extends two contiguous fins which merge therewith, each of the fins is split up into several sections offset with respect to each other and forming a plurality of concentric rings which are all formed by identical numbers of sections.

Apart form these main arrangements, the invention comprises certain other arrangements which are preferably used at the same time and which will be more explicitly discussed hereafter.

In what follows, several preferred embodiments of the invention will be described with reference to the accompanying drawings, in a way which is of course in no wise limitative.

FIGS. 1 and 2 of these drawings show an electromagnetic retarder rotor constructed in accordance with the invention, respectively in a semi end view along arrow I of FIG. 2, and a semi axial view along II—II of FIG. 1, the corresponding stator being further shown in ghost outline in FIG. 2.

FIGS. 3 and 4 are cross sections of FIGS. 1 respectively along III—III and IV—IV.

The word "rotor" used in the present text designates more precisely each of the one piece sub-assemblies 1 which form part of the rotor assembly with axis X of an electromagnetic or "eddy current" retarder and which comprise an armature or "induced" disc 2 made from a ferromagnetic material.

Such a disc 2 is fixed to the shaft 3 to be retarded, such as the transmission shaft of a vehicle, and it is mounted so as to be able to travel in front of the stator 4 of the retarder, or more precisely in front of a ring of inductive poles 5, alternately positive and negative, forming part of the stator, with interpositioning of an air-gap E, disc 2 in question being then the seat of eddy currents which result in braking and heating this disc.

The rotor assembly of the retarder comprises, in addition to the rotor or above defined sub-assembly, which is in one piece or preferably split into two on each side of the stator, an intermediate part 6 of revolution about axis X, such as a sleeve, hub or plate, itself fixed generally by bolting to the shaft 3 to be retarded, each "rotor" 1 here considered being fixed by bolting to this intermediate part.

In a way still known per se, each rotor 1 comprises, in addition to disc 2, and moulded integrally therewith :

a fixing ring 7 of a mean diameter less than the inner diameter of disc 2, formed with axial bores 8, threaded or not, for receiving bolts for fixing this ring to the intermediate part 6, a ring of ventilation fins 9 projecting from the face of disc 2 opposite its face defining the air-gap E, a ring of arms 10 extending some of fins 9 towards axis X and themselves connected to ring 7, and an annular rim or flange 11 generally extending parallel to the disc and connecting the tips of the fins 9 together so as to form, between these fins, the disc and the flange, guide channels 12 for the ventilation air.

Each fin 9 is defined by two parallel or substantially parallel faces slanted with respect to the corresponding radii rearwards considering the direction of rotation R of the rotor, if we consider the increasing radii, and curved so that their concavities are turned rearwards, the angle of slant formed by each fin face at each of its points along the corresponding radius being greater than 45° and particularly about 50° to 60°.

The arms 10 are preferably axially bent, as in the embodiment illustrated in FIG. 2, so as to cause the ring 7 to "re-enter" inwardly of the stator and thus reduce the axial dimension of the central portion of the rotor.

But arms 10 could also be "straight", their mean lines then remaining substantially contained in the same transverse plane.

The number of arms 10 of each rotor is advantageously equal to 8.

It is the removal of the heat generated in disc 2 by th creation of eddy currents during use of the retarder that the present invention proposes improving.

For this, the thickness of fins 9 and their mutual spacing are much smaller than in known constructions, these fins being therefore much more numerous and closer together.

The thickness in question, which was about 8 mm in prior art constructions, is here less than 5 mm and preferably about 3 to 4 mm when the mutual spacing of two consecutive fins, considered in the direction perpendicular to these fins, at the narrowest position of the gap between said fins, which spacing was greater than 15 mm in prior art constructions, is here less than 10 mm and preferably about 5 mm.

The result is that the number of fins is much higher than before: thus, for a rotor whose outer diameter is about 50 cm, said number is for example equal to 64, as in the illustrated embodiment, whereas before it was at most equal to 24.

The arms 10 which connect the finned disc to the fixing ring 7 are thicker than fins 9.

In the embodiment illustrated in the figures, each arm 10 extends two consecutive fins 9 which merge in these arms: the thickness of said arms is a little less than the total of the thicknesses of the fins and of the gap which separates the latter, being more particularly about 12 mm.

In the embodiment illustrated, there is further provided in the middle of the axial height of the fins, i.e. half way between disc 2 and flange 11, a flat annulus 13 which holds said fins spaced apart and is moulded integrally therewith.

This annulus 13 is preferably defined by two very close transverse planes, their spacing apart—which defines the axial thickness of the ring—being preferably about 3 mm.

As can be seen in FIGS. 2 and 3, the different channels 12 defined for the ventilation air by disc 2, flange 11, annulus 13 and fins 9 are narrow and close together and succeed each other while being juxtaposed not only in a circumferential direction but also in the axial direction, in the manner of a nest of channels with squared cross section or honeycombs.

As can be seen in FIG. 3, flange 11 is as thin as annulus 13, its axial thickness being advantageously about 3 mm.

With a rotor formed in the way described and illustrated in the drawings, cooling of the disc is greatly improved and the increase of the retarding torque resulting from such improvement, when the retarder is hot and is operating at cruising speed, is considerable, this increase reaching and even exceeding 50% of said torque for the numerical values given above.

As far as the method of manufacturing the above described rotor is concerned, recourse is advantageously had to a precision moulding process using a lost pattern such as that propagated under the name POLYCERAM by the firm "Fonderies et Aciers de Bourges".

According to this process, the lost pattern is formed by compressing expanded polystyrene balls in a pattern box, representing in negative the part to be produced, then injecting wax therein, then coating the pattern thus formed with a thin ceramic shell by dipping in an appropriate slip and hardening said shell by baking in an oven, which eliminates said pattern itself by combustion. The thus hardened shell is then placed in a moulding box filled with dry sand before receiving the liquid steel.

Following which and whatever the embodiment adopted, a rotor is finally obtained whose construction and advantages (particularly the appreciable improvement in cooling and, consequently, the considerable increase of the retarding torque when hot) follow sufficiently from the foregoing.

As is evident, and as it follows moreover already from what has gone before, the invention is in no wise limited to those of its modes of application and embodiments which have been more particularly considered; it embraces, on the contrary, all variants thereof, particularly those in which each of the fins is made of several sections offset with respect to each other and forming a plurality of concentric rings which are all formed by identical numbers of sections.

I claim:

1. Armature rotor for electromagnetic retarder, comprising at least one disc (2) extended axially on one of its faces by a plurality of fins (9) each fin being defined by two parallel or substantially parallel faces slanted at each of their points rearwards with respect to the corresponding radii by angles greater than 45° an curved so that their concavities are turned rearwards, the tips of the fins being connected together by an annular flange (11) and the assembly formed by the disc, the fins and the flange being made as a single moulded block from ferromagnetic material, characterized in that the fins (9)

are particularly thin, numerous and so close together, the thickness of each fin being less than 5 mm and the width of the gap between two consecutive fins, in its narrowest zone, considered perpendicularly to the facing faces of the fins, being less than 10 mm.

2. Rotor according to claim 1, characterized in that the number of fins (9) is greater than 24.

3. Rotor according to claim 2, characterized in that the number of fins (9) is equal to 64.

4. Rotor according to claim 1, characterized in that the thickness of each fin (9) is about 3 to 4 mm.

5. Rotor according to claim 1, characterized in that the fins (9) are joined together at an intermediate level between their base and their tip by a thin annulus (13) moulded integrally therewith.

6. Rotor according to claim 5, characterized in that the annulus (13) is flat.

7. Rotor according to claim 5, characterized in that the thickness of the annulus (13) is about 3 mm.

8. Rotor according to claim 1, comprising arms (10) for connection to a fixing ring (7), characterized in that each arm extends two contiguous fins (9) which merge therein.

9. Rotor according to claim 1, characterized in that each of the fins (9) is split into several sections offset with respect to each other and forming a plurality of concentric rings which all comprise identical number of sections.

10. Rotor according to claim 1, characterized in that the disc (2) is fixed to an internal fixing ring (7) by arms (10) extending some of the fins (9), this ring and these arms being moulded integrally with the disc.

* * * * *